United States Patent
Swaine et al.

(10) Patent No.: US 7,069,176 B2
(45) Date of Patent: Jun. 27, 2006

(54) TRACE SOURCE CORRELATION IN A DATA PROCESSING APPARATUS

(75) Inventors: Andrew Brookfield Swaine, Cambridge (GB); Daryl Wayne Bradley, Cambridge (GB); Sheldon James Woodhouse, Stow-cum-Quy (GB)

(73) Assignee: ARM Limited, Cambridge (GB)

( * ) Notice: Subject to any disclaimer, the term of this patent is extended or adjusted under 35 U.S.C. 154(b) by 221 days.

(21) Appl. No.: 10/635,916

(22) Filed: Aug. 7, 2003

(65) Prior Publication Data

US 2005/0033553 A1    Feb. 10, 2005

(51) Int. Cl.
*G04F 5/00* (2006.01)

(52) U.S. Cl. ............... 702/176; 702/177; 702/178; 702/187; 717/128; 714/45

(58) Field of Classification Search ............... 702/176, 702/177, 178, 187; 711/162, 154; 717/124, 717/128; 714/45
See application file for complete search history.

(56) References Cited

U.S. PATENT DOCUMENTS 5,165,036 A    11/1992   Miyata et al.
6,018,809 A    1/2000    Garrett
6,021,261 A    2/2000    Barrett, Jr. et al.
6,345,295 B1   2/2002    Beardsley et al.
6,470,388 B1   10/2002   Niemi et al.
6,769,054 B1 * 7/2004    Sahin et al. ................ 711/162
2002/0188831 A1 12/2002  Jackson et al.

FOREIGN PATENT DOCUMENTS

| DE | 199 30 120 | 1/2001 |
| GB | 2 366 050 | 2/2002 |
| WO | WO 00/63777 | 10/2000 |
| WO | WO 01/20456 | 3/2001 |

\* cited by examiner

*Primary Examiner*—John Barlow
*Assistant Examiner*—Hien Vo
(74) *Attorney, Agent, or Firm*—Nixon & Vanderhye P.C.

(57) ABSTRACT

An integrated circuit is provided with multiple data processing components associated with respective sources which generate trace data streams. A reference timestamp generator is provided and the trace data streams are annotated such that they are output off-chip together with reference timestamp data. Outputting the reference timestamp data together with the trace data streams enables temporal correlation between points in different trace data streams by trace analysis tools.

28 Claims, 6 Drawing Sheets

TRACE SOURCE CORRELATION IN A DATA PROCESSING APPARATUS

BACKGROUND OF THE INVENTION

1. Field of the Invention

This invention relates to data processing systems. More particularly, this invention relates to data processing systems providing temporal correlation between trace data sources.

2. Description of the Prior Art

The drive to reduce development time for new data processing systems means that there is a need to improve the debug and tracing tools that may be used during the development of data processing systems. Tracing the activity of a data processing system whereby a trace stream is generated including data representing the step-by-step activity in the system is a highly useful tool in system development. For example, tracing the activity of the data processing system may involve: tracking the contents of registers; tracking the values stored at particular locations in cache and/or external memory; or monitoring the status bus lines, paths or modules associated with a processor core.

For processor cores that are deeply embedded in much larger Application Specific Integrated Circuit (ASIC) designs it is generally not possible to determine how a processor core is operating simply by observing the pins of the ASIC because the ASIC typically includes significant amounts of on-chip memory. Furthermore, given the general increase in processing speeds as data processing systems evolve, the speed at which trace data must be captured in order to trace the real time operation of the system is increasing in a corresponding manner. For these reasons increased amounts of tracing functionality are being placed on-chip rather than off-chip. Examples of such on-chip tracing mechanisms are the Embedded Trace Macrocells provided by ARM Limited, Cambridge, England, in association with various of their ARM processors.

As data processing systems increase in complexity it is becoming common to use system-on-chip designs including multiple processing components, each component performing its own data processing operations and communicating with the other processing components. For example, a single integrated circuit may comprise several processor cores and/or digital signal processors. In such multi-component systems each processing component can be separately traced and will thus generate its own trace data stream. Each trace data stream that must be routed, processed and output or stored prior to analysis off-chip using appropriate diagnostic tools.

A problem with analysis of trace data streams produced by different processing components is that each processing component generates trace data in dependence upon an associated local clock signal. This means that the trace data streams output by different trace data sources are not temporally correlated. However since there is typically some interdependency between the processing operations performed by different processing components of the integrated circuit, diagnostic tools need to be able to temporally correlate trace events in different trace data streams to properly debug the system.

SUMMARY OF THE INVENTION

Viewed from one aspect the present invention provides an apparatus for processing data, said apparatus comprising at least two trace data sources, each of said at least two trace data sources being operable to generate a respective trace data stream;
a reference timestamp generator operable to generate reference timestamp data;
a trace data annotator operable to output said trace data streams together with said reference timestamp data associated with points within said respective trace data streams to provide temporal correlation between said at least two trace data sources.

The present technique recognises the need to provide information for temporal correlation of events within trace data streams originating from different trace data sources. More particularly, the present technique recognises that generating reference timestamp data and annotating the trace data streams with the reference timestamp data prior to output provides an effective way of enabling temporal correlation between points in the trace data stream to be performed down-line by trace analysis tools. Thus outputting reference timestamp data together with the trace data streams permits relational analysis of trace data streams from different trace data sources in the system.

The reference timestamp generator may be separately provided, or alternatively one of the trace data sources may serve as a reference timestamp generator with its local time being used as reference time for multiple sources.

According to one preferred embodiment of the invention, the reference timestamp data is output as an individual data stream together with data streams corresponding to each of the trace data sources. This allows the reference timestamp data to be associated with points in the trace data streams at a subsequent data processing stage. Outputting the reference timestamp data as an individual data stream obviates the need to introduce a more complex source protocol (as would be required for insertion of the reference timestamp data into the trace data stream).

According to an alternative preferred embodiment of the invention, the reference timestamp data is inserted into the trace data stream itself prior to output. This avoids the need to correlate reference timestamp data with points in a plurality of different trace data streams downstream of the trace data annotator.

It will be appreciated that the at least two trace data sources could produce trace data streams according to a variety of different trace data output formats. However, it is preferred that the trace data streams are cycle-accurate trace data streams since this allows accurate interpolation of times between points of known time.

Advantageously, local clocks associated with respective trace data sources can be used to generate local timestamp data associated with points in the trace data streams giving a cycle-accurate trace. The local timestamp data may be output together with the reference timestamp data. This allows a cross-correlation of local and reference timestamp data and aids interpolation between points in the trace data stream for which reference timestamp data is available.

In preferred embodiments of the invention at least one of the trace data sources is operable to output marker packets at marker points in the trace data stream. These marker packets facilitate temporal correlation between points in the trace data streams since they can be used to index reference timestamp data output by the reference timestamp generator. The marker packets can also be used for interpolation purposes.

Furthermore, if local timestamps and/or a source identifier are output with the marker packet, this information can be associated with a corresponding reference timestamp and supplied to a trace data analysis tool for temporal correlation of output from the different sources.

Although the trace data sources and reference timestamp data could be output by the trace data annotator as separate data streams, in preferred embodiments of the invention, the trace data streams and the reference timestamp data are combined prior to output. This reduces the number of inputs and outputs that must be provided to and from the trace data sources and thus reduces the pin count.

Whilst it will be appreciated that the trace data sources can take a wide variety of different forms and may be considered to include the processing elements which they are monitoring, such as a processor core, a digital signal processor and a memory bus monitor. A further preferred trace data source is one which may be software controlled, such as one which generates trace data in response to a software controlled write to one or more predetermined memory locations.

Whilst the present invention could be used in an apparatus composed of separately formed circuit elements, it is particularly well suited to embodiments in the form of an integrated circuit, such as a system-on-chip design.

Viewed from another aspect the present invention provides a method of processing data, said method comprising the steps of:

generating at least two trace data streams from respective trace data sources;

generating reference timestamp data associated with points in said at least two trace data streams;

annotating said at least two trace data streams by outputting said at least two trace data streams together with said reference timestamp data associated with said points in said at least two data streams to provide temporal correlation between said at least two trace data sources.

Viewed from yet another aspect the present invention provides a computer program product carrying a computer program for controlling a data processing apparatus to analyse at least two annotated trace data streams comprising trace data together with reference timestamp data associated with points within said at least two data streams, said computer program product comprising:

trace data processing code operable to perform temporal correlation between said points in said at least two trace data streams using said reference timestamp data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
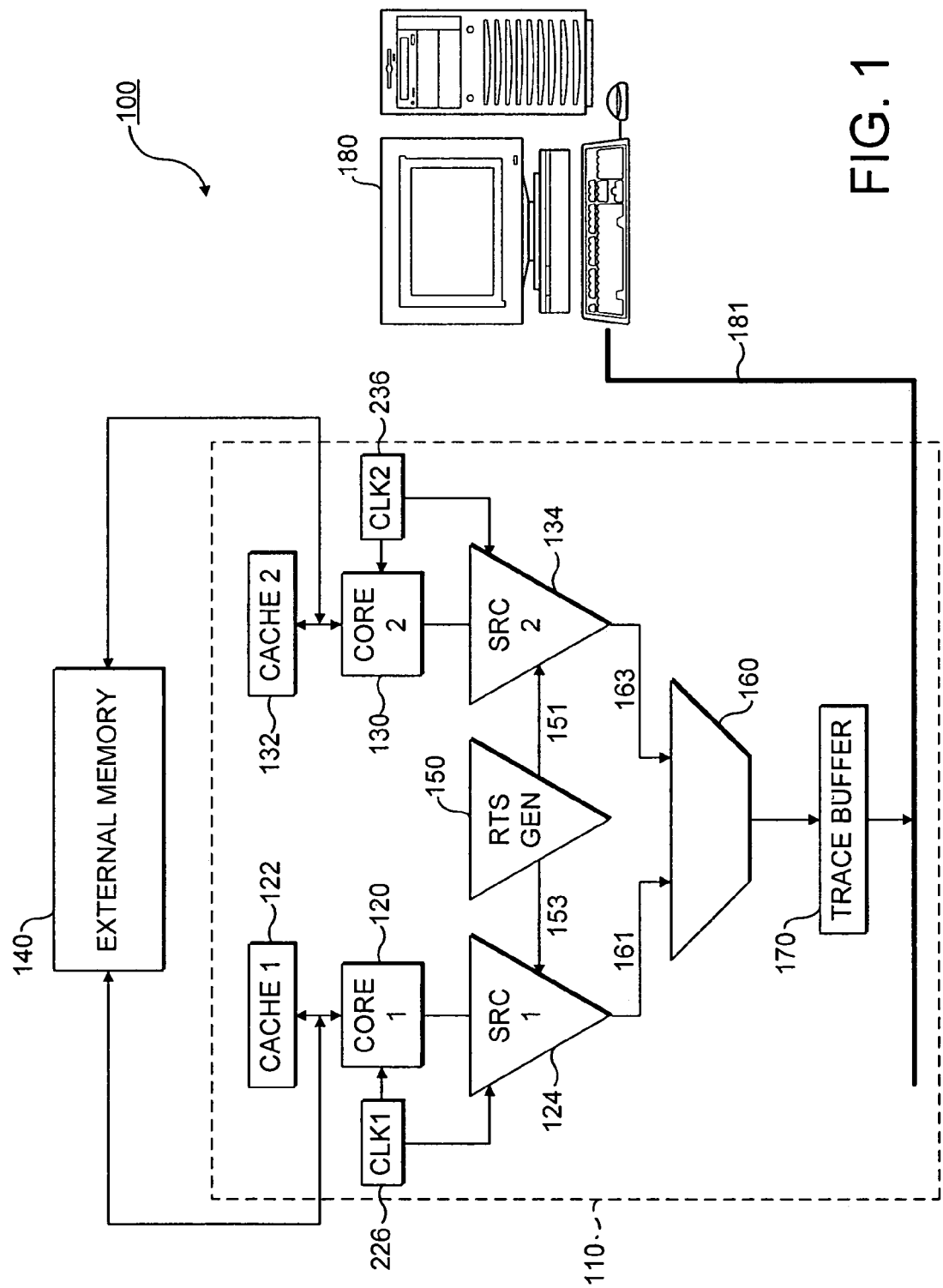
FIG. 1 schematically illustrates a first multiple core data processing system, which provides an on-chip tracing mechanism and outputs temporal correlation data.

FIG. 1 schematically illustrates a first multiple core data processing system 100 according to the present technique, which provides an on-chip tracing mechanism and outputs temporal correlation data. The data processing system comprises: an integrated circuit 110; a first processor core 120 and associated first cache memory 122 and first trace source 124; a second processor core 130 and associated second cache memory 132 and second trace source 134; an external memory 140; a timestamp generator 150; a data combiner 160; a trace buffer 170; and a general purpose computer 180.

The first cache 122 and the second cache 130 are each connected to the external memory 140, which is accessed when a cache-miss occurs following a data load instruction. The general purpose computer 180 is connected to the output of the trace buffer 170 and serves to recover and analyse trace data streams generated by the first and second trace sources 124, 134 using analysis software. The first and second processor cores 120, 130 are monitored by respective trace sources 124, 134. In this case the trace sources 124, 134 are ARM ETMs, which have of two main functional components (not shown)—a trace block and a trigger block. The trigger block comprises programmable resources that allow the user to specify a filter condition, which causes the output of trace data and a trigger condition which causes trace capture to cease. Tracing full operation of the system would result in production of an inconveniently large volume of data and would be inappropriate for diagnosing specific parts of the data processing system or specific types of behaviour. For example if a system bug is known to be associated with exception behaviour then the filter condition could be set such that trace data is output upon system access to the appropriate exception handling vector. The trace block is operable to generate and to output a compressed trace data stream. Debugger software running on the general purpose computer 180 is operable to decompress the compressed trace data stream. Since the debugger software is unlikely to be able to process the output of the trace sources 124, 134 in real-time the trace data is initially stored in the trace buffer. When the trace buffer is full, new trace overwrites old trace until the trigger condition occurs, when the contents of the buffer is frozen. The trigger condition typically represents the detection of a predefined error condition being diagnosed by the tracing mechanism. Trace and debug analysis software running on the general purpose computer extracts the trace data from the trace buffer once the trigger condition has occurred.

In this arrangement the first and second trace sources 124, 134 produce cycle-accurate trace data streams. A cycle-accurate trace data stream is considered as one in which the time between critical events in the trace data stream, such as instruction execution events and/or data transfer events, is traced in some form. Whilst the time is most commonly measured by the number of intervening clock cycles as seen by the trace source, it can instead be measured by clock cycles as seen by the processor core in situations where this differs, or it can be measured in seconds. Furthermore, whilst relative timestamps are most commonly given, indicating the time since the last timestamp, absolute timestamps can instead be given, indicating the time since a common point. Where relative timestamps are given, the absolute value of the timestamps is dependent upon the point at which the debug/trace analysis software begins decompression of the trace stream. An example means for providing cycle-accurate trace is provided in the ETM Architecture Specification by ARM Limited, ARM IHI 0014. The reference timestamp generator 150 generates reference timestamp data and supplies the timestamp data directly to the trace data sources 124, 134 via signal lines 151 and 153. In this arrangement the reference timestamp data is inserted directly into the trace data stream. This provides the trace data annotator mechanism in this example embodiment. One of the trace sources 124, 134 may in an alternative embodiment (not illustrated) serve as the reference timestamp generator with its local timestamps being treated as reference timestamps.

Timestamp information for both local and reference timestamp data may be absolute, or relative to the previous timestamp output. One preferred embodiment of this is to use absolute reference timestamp data and relative local timestamp data.

Figure 2:
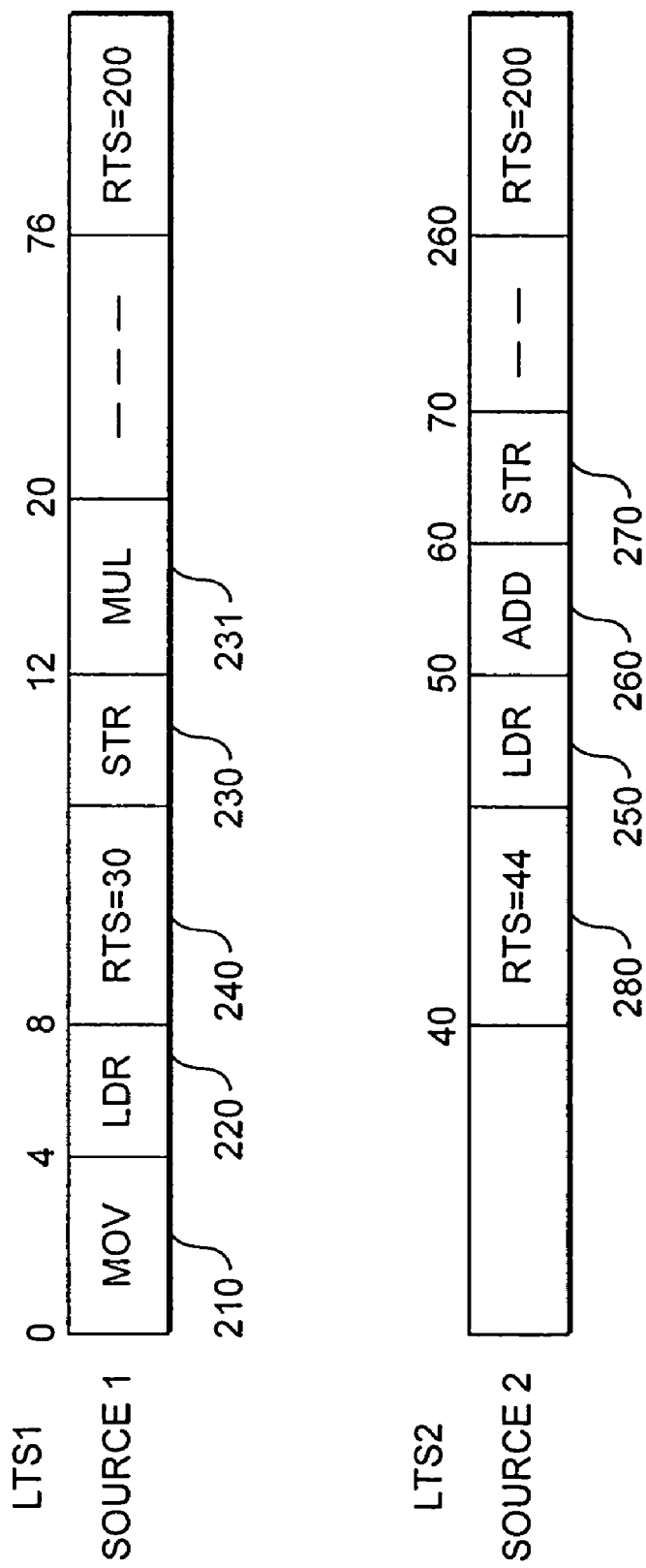
FIG. 2 schematically illustrates the contents of the two trace data streams output by the two trace data sources of FIG. 1.

FIG. 2 schematically illustrates the contents of the two trace data streams output by the two trace data sources of FIG. 1. In this example the trace data streams correspond to instruction trace streams rather than data trace streams. In particular, the trace data stream output by the first trace data source 124 comprises a sequence composed of a move (MOV) instruction 210, a LOAD (LDR) instruction 220 and a store (STR) instruction 230 and a multiply (MUL) instruction 231. A reference timestamp 240 has been inserted in the trace data stream prior to the store instruction 230 and is associated with the store instruction. The trace data stream output by the second trace data source 134 comprises a sequence composed of a load instruction 250, an add instruction 260 and a store instruction. A reference timestamp 280 has been inserted in the trace data stream prior to the load instruction 250. In this example the load instruction on the second core 130 is known to result from the store instruction 230 on the first core. Accordingly, the reference timestamp of the load instruction is equal to 44 whereas the reference timestamp of the store instruction is equal to 30. The reference timestamp can be used to cross-check the temporal correlation of individual trace events occurring on the first core 120 and the second core 130. The first trace data source 124 and the second trace data source 134 output trace data streams that are cycle accurate with regard to the clock signal of the respective processor core. These cycle-accurate trace data streams provide an indication of event ordering and relative timing within the stream itself. However, the reference timestamp information is required for temporal correlation of events derived from different trace data streams. According to the present technique, the trace data streams are annotated with the reference timestamp information on-chip, which provides a more accurate indication of the times of occurrence of the trace events.

Returning now to FIG. 1, the trace data streams output by the first trace data source 124 and the second trace data source 134 are supplied to the data combiner 160 via signal lines 161 and 163 respectively. The combiner 160 combines the two annotated trace data streams and outputs them to the trace buffer 170. The combiner 160 comprises a trace bus (not shown) coupled to the two trace data sources 124, 134. The trace bus includes trace data signal lines and trace source identifying signal lines operable to carry trace source identifiers (source IDs). The source IDs enable the trace/debug analysis software to discriminate between trace data from the first and second trace data sources 124, 134. The general purpose computer 180 is connected to the trace buffer via a bus 181. Debug and trace analysis software running on the general purpose computer 180 recovers trace data including the reference timestamp data from the trace buffer on the occurrence of the trigger condition and performs temporal correlation of trace events from the two different trace sources 124, 134 using the reference timestamp data. The trace/debug analysis software is provided in advance with a sequence of instructions being executed by each of the two processor cores 120, 130 which is referred to when analysing the sequence of trace events that is reconstructed from the recovered trace data.

In the arrangement of FIG. 1 the trace data sources 124, 134 are associated with processor cores 120, 130. However in alternative arrangements, one or more of the processor cores could be replaced by a digital signal processor or a memory bus monitor for example. Yet a further alternative would be to provide a software-controlled trace data generator so that, for example, a data value written to a location within a predetermined address range is output as trace data thereby allowing software being executed to output diagnostic data in the form of trace information. Furthermore, the integrated circuit may comprise an arbitrary number of trace data sources.

Figure 3:
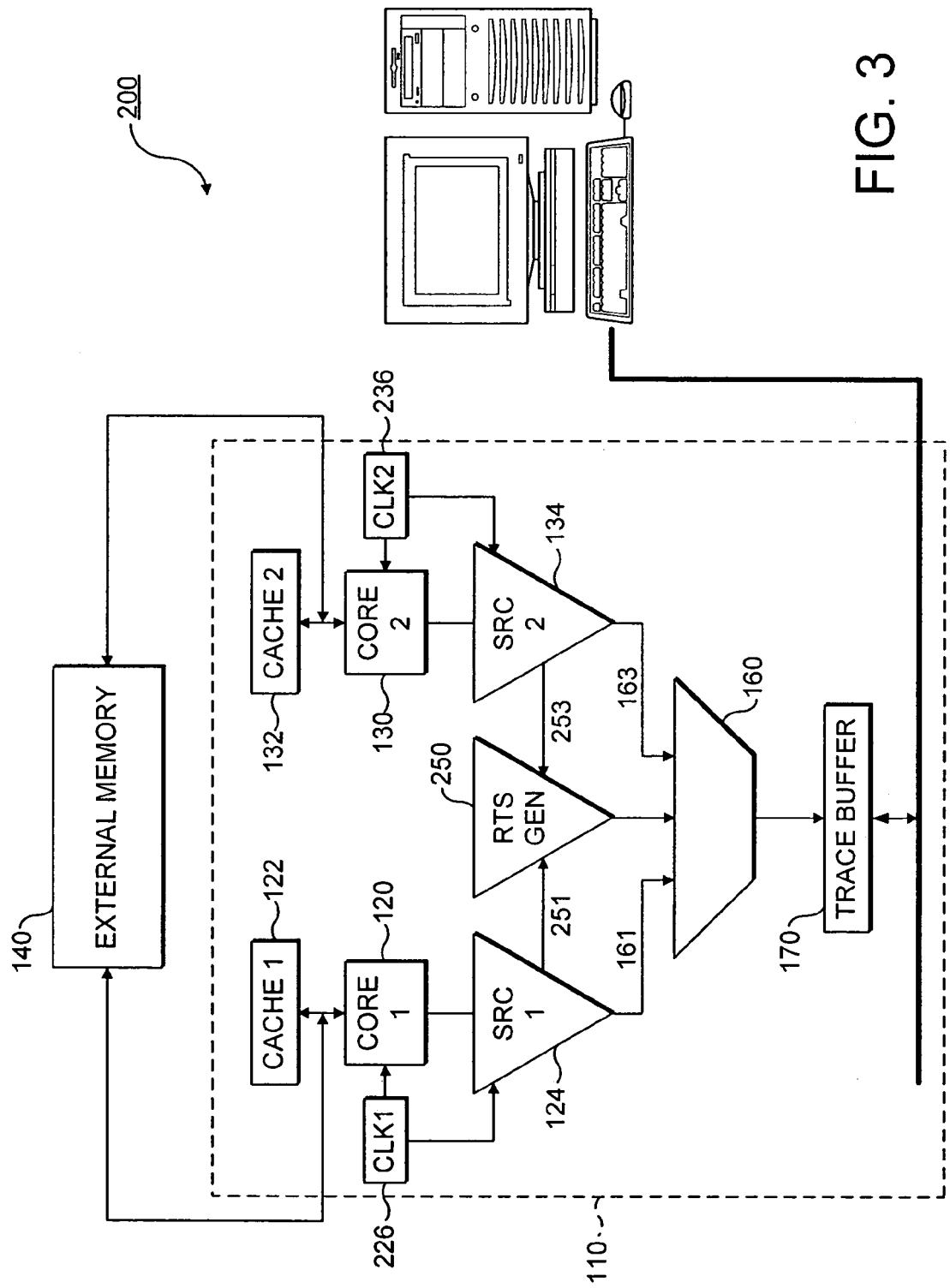
FIG. 3 schematically illustrates a second multiple core data processing system, which provides an on-chip tracing mechanism and outputs temporal correlation data.

FIG. 3 schematically illustrates a second multiple core data processing system 200 according to the present technique, which provides an on-chip tracing mechanism and outputs temporal correlation data. This second system comprises many of the same components as the system of FIG. 1. However, the system of FIG. 3 differs in that the reference timestamp generator 250 outputs an individual timestamp stream directly to the data combiner 160 rather than to the trace data sources 124, 134. FIG. 3 shows first and second local clocks 226, 236 associated respectively with the first core 120 and the second core 130. In this arrangement, local timestamp data generated by the local clocks 226, 236 is utilised by the respective trace data source 124, 134 to timestamp the corresponding trace data stream (local timestamps could also be added to their own trace data streams by the trace data sources of FIG. 1). Inclusion of local timestamps in the trace data stream is particularly desirable when the trace data source 124, 134 does not produce cycle-accurate data. The trace data streams that are output by the first and second trace data sources and supplied along signal lines 161 and 162 to the combiner 160 comprise source ID data and locally timestamped trace data. The reference timestamp generator 250 generates reference timestamp data in response to reference timestamp request (RTSREQ) signals from the first trace data source 124 and/or the second trace data source 134. The RTSREQ signals are sent via the signal lines 251 and 253. The RTSREQ signals are sent to the reference timestamp generator 250 by one of the trace data sources substantially simultaneously with the output by that trace data source of a marker packet. This will be described in more detail below with reference to FIGS. 4 and 5. The combiner 160 combines the reference timestamp data from the reference timestamp generator 250 with the two locally timestamped trace data streams from the first and second trace data sources 124, 134. The combiner forms a trace stream comprising of a source ID and corresponding local timestamp information and reference timestamp information for points in the trace data stream at which marker packets were output by the trace data sources. The combined data is output to the trace buffer 170. The trace/debug analysis software on the general purpose computer uses the timestamp correlation packets to perform temporal correlation of trace events from the two trace data sources 124, 134.

Figure 4:
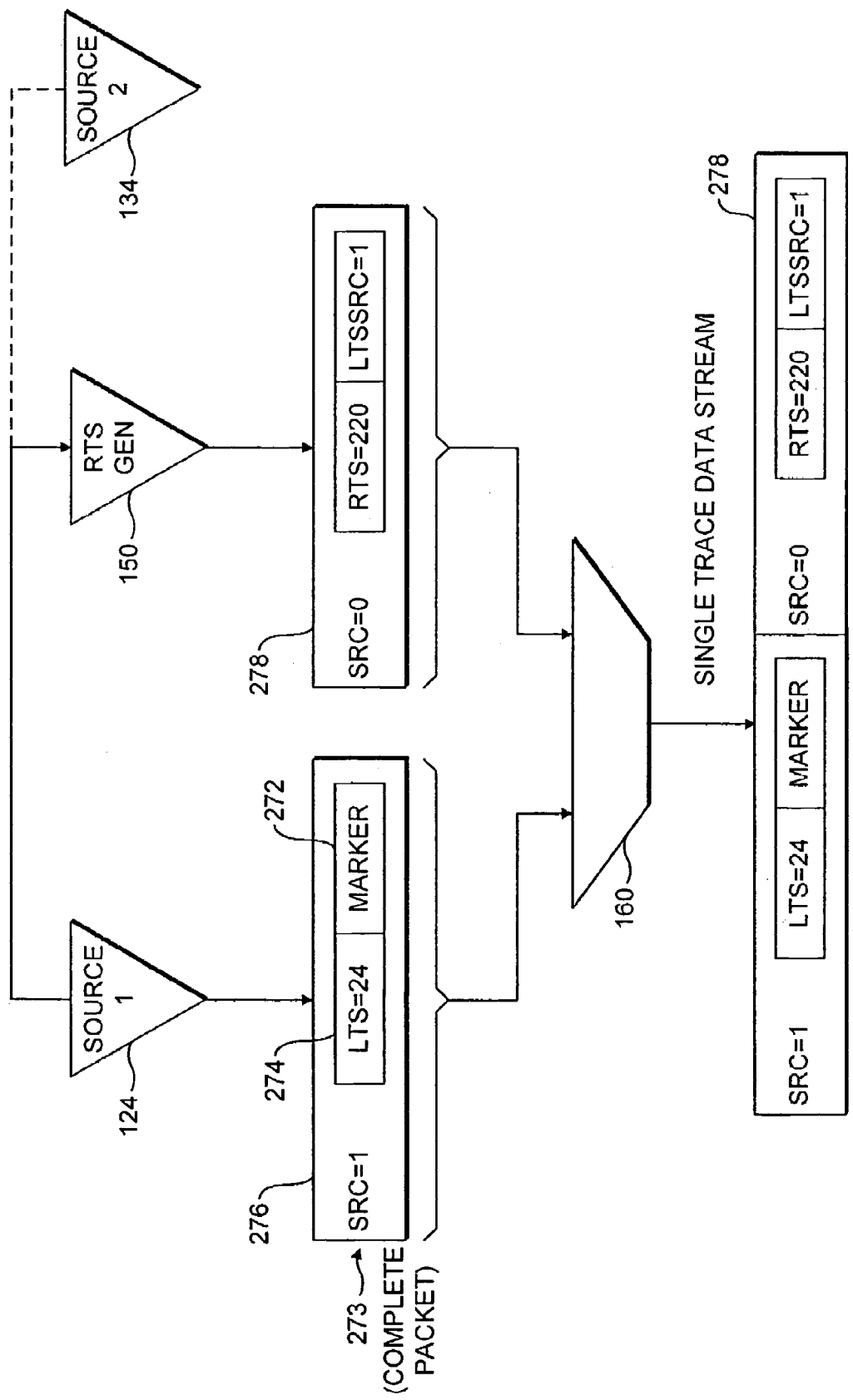
FIG. 4 schematically illustrates how the arrangement of FIG. 3 generates timestamp correlation packets.

FIG. 4 schematically illustrates how the arrangement of FIG. 3 generates timestamp correlation packets. Consider a timestamp correlation packet generated by the first trace data source 124. The first trace data source outputs a marker packet 272 indicating a correlation point in the trace data stream. The marker packets may be output when a particular instruction or data value is encountered in the trace data stream or may simply be output periodically. It will be appreciated that "markers" can be special packets inserted into the trace. Alternatively markers can be a regularly occurring packet that cause a timestamp request and are themselves treated as the marker. One example is the use of an I-sync packet. In addition to the marker packet 272, the first trace source outputs local timestamp information 274 corresponding to the marker packet and a source identifier 276. Substantially simultaneously with the output of the marker packet, the first trace source 124 issues a reference timestamp generation request (RTSREQ) to the reference timestamp generator. The local timestamp 274, the marker packet 272, the source ID and the associated reference timestamp 278 are supplied to the combiner that combines the received data to create a single trace stream at 280. Accordingly the trace stream 280 comprises of packets 273 and 278 as a reference timestamp. The order of 273 and 278 output to 280 is arbitrary. The timestamp correlation packets can be produced independently by each of the two trace data sources 124, 134 and are used by the trace/debug analysis software on the general purpose computer 180 to perform temporal correlation. The system of FIG. 4 provides the trace data annotation mechanism in this example embodiment.

Figure 5A:
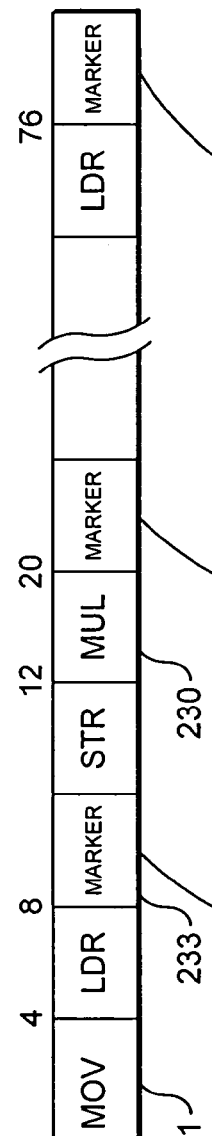
FIGS. 5A to 5C schematically illustrate three data streams output by system components of the integrated circuit of FIG. 3.
Figure 5B:
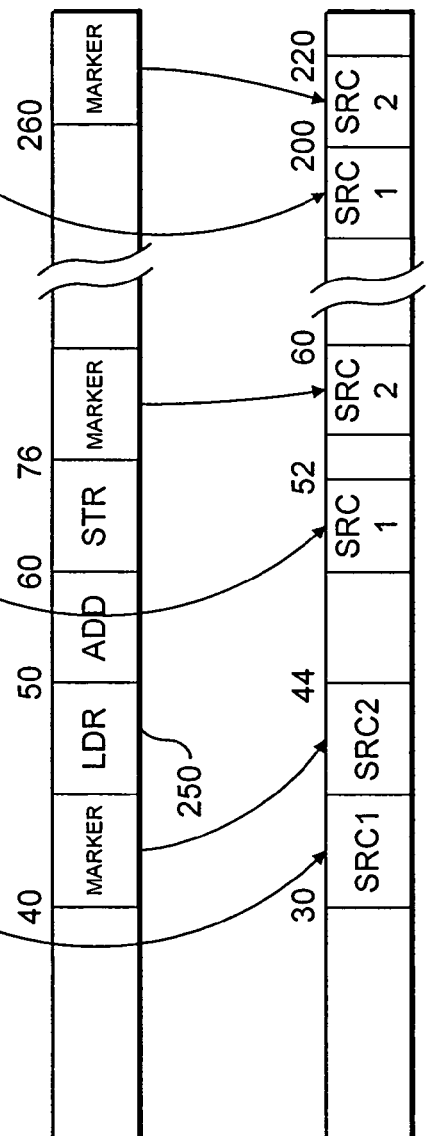
Figure 5C:
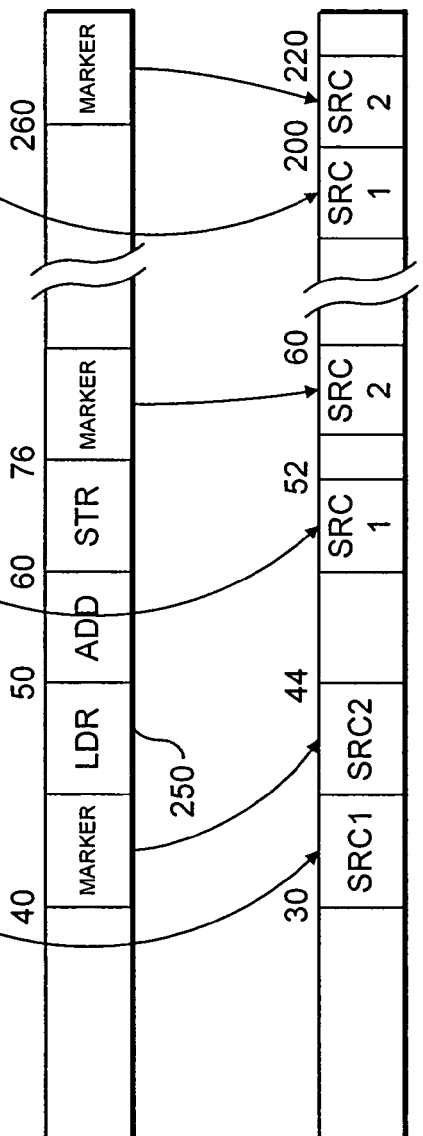

FIGS. 5A to 5C schematically illustrate three data streams output by system components of the integrated circuit of FIG. 3.

FIGS. 5A schematically illustrates a trace data stream output by the first trace data source 124. This first data stream comprises a move instruction, a load instruction and a store instruction and a multiply, which are output consecutively, followed by a second load instruction that is output sometime later. The sequence corresponds to local timestamps from zero through to 76. Marker packets (indicated by arrows) were output by the first trace data source at local timestamps of 8, 20, 76.

FIG. 5B schematically illustrates a trace data stream output by the second trace data source. This second data stream comprises a load instruction and add instruction and a store instruction, which are output consecutively. It can be seen that the local timestamps associated with the second data stream are inconsistent with those associated with the first data stream (of FIG. 5A). This is to be expected since the two clock sources 226, 236 associated with respective processor cores are independent of each other. Marker packets were output by the second trace data source at local timestamps of 40, 70 and 260.

FIG. 5C schematically illustrates a timestamp correlation stream comprising as output by the combiner 260. The timestamp correlation stream comprises a timestamp correlation packet for each point the two trace data streams at which a marker packet was output by the source. Accordingly it can be seen from FIG. 5C that: at a reference timestamp of 30 source 1 had a local timestamp source marker; at a reference timestamp of 44 source 2 had a local timestamp source marker; at a reference timestamp of 52 source 1 had a local timestamp source marker; at a reference timestamp of 60 source 2 had a local timestamp source marker; at a reference timestamp of 200 source 1 had a local timestamp source marker; and at a reference timestamp of 220 source 2 had a local timestamp source marker. The marker points and associated global and local timestamp data can be used both to temporally correlate given trace events between the two different trace data streams and to interpolate between marker points within a given trace data stream. For example, we may wish to temporally correlate the store event 230 in the first trace data stream (FIG. 5A) with the load event 250 in the second trace data stream (FIG. 5B) or we may wish to interpolate between the marker packet corresponding to CLK2=40 and the marker packet corresponding to CLK2=70 to establish a reference timestamp value for the add instruction.

Figure 6:
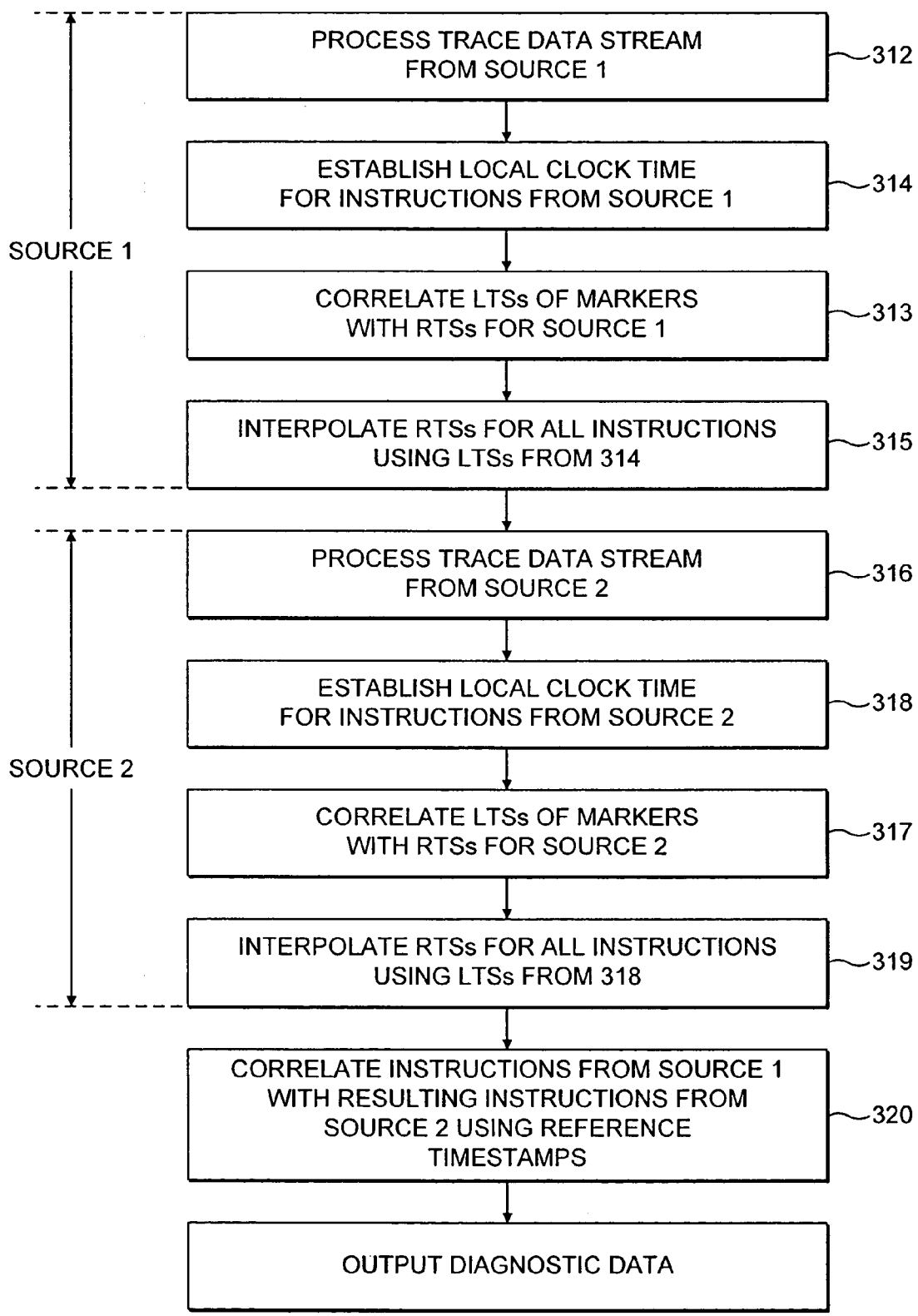
FIG. 6 is a flow chart that schematically illustrates a sequence of operations performed by the debug/trace analysis software running on the general purpose computer.

FIG. 6 is a flow chart that schematically illustrates a sequence of operations performed by the debug/trace analysis software running on the general purpose computer 180. At stage 312 the software processes the trace data stream from the first trace data source 124 and proceeds to stage 314, where it establishes a local clock time (LTS=8) that occurred during the LDR instruction 233 in the first data stream. The data stream is identified via the source ID signal sent along the trace bus.

At stage 313 the LTSs from the first data source 124 are temporally correlated by analyzing the reference timestamp data from the temporal correlation packets.

At stage 315 the reference timestamp data from the temporal correlation packets is used to interpolate the LTSs for all instructions from the first trace data source 124.

Next, at stage 316 the analysis software processes the trace data stream from the second trace data source 134 and proceeds to stage 318 where it establishes a local clock time (LTS=40) for the load instruction 250.

At stage 317 the LTSs from the second data source 134 are temporally correlated by analyzing the reference timestamp data from the temporal correlation packets.

At stage 319 the reference timestamp data from the temporal correlation packets is used to interpolate the LTSs for all instructions from the second trace data source 134.

Subsequently, at stage 320, the store instruction 230 from the first source and the load instruction from the second source are temporally correlated by analysing the reference timestamp data from the temporal correlation packets using the data provided by state 315 for the first source and second stage 319 for the second source where it was determined that the store instruction 230 corresponds to a reference timestamp 30, whereas the load instruction 250 corresponds to a reference timestamp 40. Since it is known by the debug software that the load instruction 250 should derive from the store instruction 230, the ordering of events established via the reference timestamp data has confirmed in this case that system is operating correctly in this respect. Finally, at stage 322 the diagnostic data is output by the software analysis tool.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising
at least two trace data sources, each of said at least two trace data sources generating a respective trace data stream;
a reference timestamp generator for generating reference timestamp data;
a trace data annotator for outputting said trace data streams together with said reference timestamp data associated with a plurality of points within said respective trace data streams to provide temporal correlation between said at least two trace data sources; and
at least two local clock sources associated with respective ones of said at least two trace data sources, each of said at least two local clock sources generates local timestamp data associated with said plurality of points in said trace data streams.

2. Apparatus as claimed in claim 1, wherein one of said trace data sources also serves as said reference timestamp generator.

3. An apparatus as claimed in claim 1, wherein said trace data annotator outputs said trace data streams and a distinct data stream comprising said reference timestamp data.

4. An apparatus as claimed in claim 1, wherein said trace data annotator inserts said reference timestamp data into at least one of said trace data streams to generate a respective individual annotated trace data stream.

5. An apparatus according to claim 1, wherein said trace data streams from said at least two trace data sources are locally cycle-accurate trace data streams.

6. An apparatus as claimed in claim 1, wherein said trace data annotator outputs said local timestamp data together with said reference timestamp data and said trace data streams.

7. An apparatus as claimed in claim 1, wherein at least one of said at least two trace data sources comprises a marker packet generator for generating a marker packet at a marker point in the corresponding trace data stream and to issue a request to said reference timestamp generator to output reference timestamp data associated with said marker point.

8. An apparatus as claimed in claim 7, wherein said marker packet generator includes in said marker packet a trace source identifying signal that identifies the associated trace data source.

9. An apparatus as claimed in claim 7, wherein said marker packet generator includes in said marker packet local timestamp data from the respective trace data source and corresponding to said marker point.

10. An apparatus according to claim 1, comprising a combiner for combining said trace data streams and said reference timestamp data for output to a trace data stream processor.

11. An apparatus according to claim 1, wherein at least one of said at least two trace data sources comprises a software-triggered trace data generator such that a software-controlled write to one or more predetermined memory data stream by said software-triggered trace data generator.

12. An apparatus according to claim 1, wherein at least one of said at least two trace data sources includes:
    a processor core;
    a digital signal processor; and
    a memory bus monitor.

13. An apparatus as claimed in claim 1, wherein said apparatus comprises an integrated circuit.

14. A method of processing data, said method comprising the steps of:
    generating at least two trace data streams from respective trace data sources;
    generating reference timestamp data associated with a plurality of points in said at least two trace data streams;
    annotating said at least two trace data streams by outputting said at least two trace data streams together with said reference timestamp data associated with said points in said at least two data streams to provide temporal correlation between said at least two trace data sources; and generating, via each of said trace data sources, local timestamp data associated with said plurality of points in said trace data streams.

15. A method as claimed in claim 14, wherein said annotation comprises outputting each of said at least two trace data streams and a distinct data stream comprising said reference timestamp data.

16. A method as claimed in claim 14, wherein said annotation comprises inserting said reference timestamp data into at least one of said at least two trace data streams to generate a respective individual annotated trace data stream.

17. A method as claimed in claim 14, wherein said trace data streams from said at least two trace data sources are cycle-accurate trace data streams.

18. A method as claimed in claim 14, wherein said annotation comprises outputting said local timestamp data together with said reference timestamp data and said trace data streams.

19. A method as claimed in claim 14, comprising the step of outputting, via at least one of said trace data sources, a marker packet at a marker point in the corresponding trace data stream and sending a request to a reference timestamp generator to output reference timestamp data associated with said marker point.

20. A method as claimed in claim 19, wherein said marker packet comprises a trace source identifying signal that identifies the associated trace data source.

21. A method as claimed in claim 19, wherein said marker packet comprises local timestamp data from the respective trace data source and corresponding to said marker point.

22. A method as claimed in claim 14, comprising the step of combining said trace data steams and said reference timestamp data for output to a trace data stream processor.

23. A method as claimed in claim 14, wherein said step of generating said at least two trace data streams comprises using a software triggered trace data generator to trigger generation of a trace data stream using a software-controlled write to one or more predetermined memory locations.

24. A method according to claim 14, wherein at least one of said trace data sources includes:
    a processor core;
    a digital signal processor; and
    a memory bus monitor.

25. A method as claimed in claim 14, wherein said method is performed upon an integrated circuit.

26. A computer program product comprising a computer readable medium containing computer readable instructions that when executed control a data processing apparatus to analyse at least two annotated trace data streams comprising trace data together with reference timestamp data and local timestamp data associated with a plurality of points within said at least two data streams, said computer program product comprising:
    trace data processing code for performing temporal correlation between said points in said at least two trace data streams using said reference timestamp data and said local timestamp data.

27. A computer program product as claimed in claim 26, wherein said trace data processing code performs temporal correlation between two trace events from different trace data streams.

28. A computer program product as claimed in claim 26, wherein said trace data processing code performs an interpolation between two of said points in a given one of said at least two trace data streams.

* * * * *